April 29, 1930. W. P. VOTH 1,756,266
MOLD
Filed Aug. 18, 1926 2 Sheets-Sheet 2

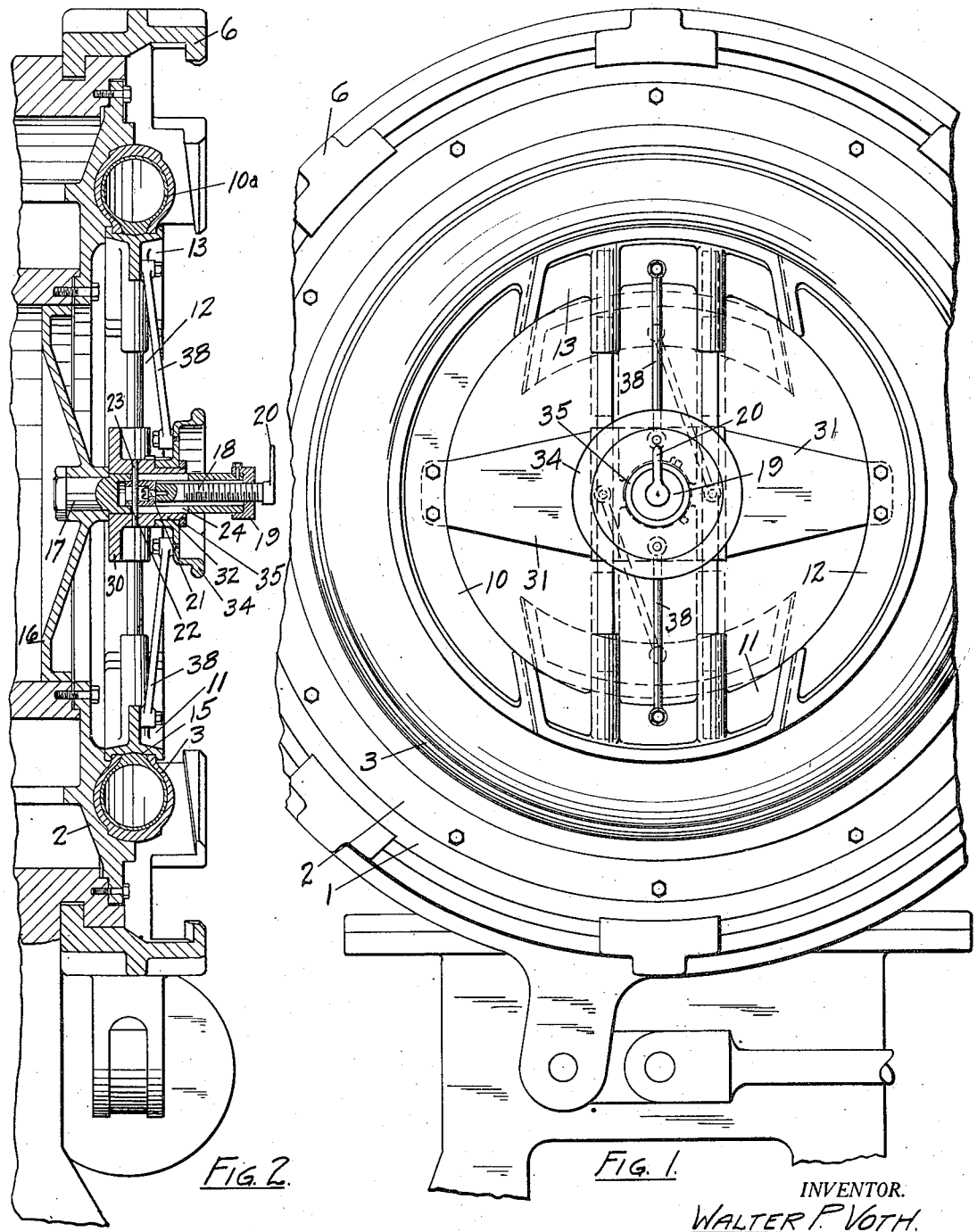

INVENTOR.
WALTER P. VOTH.
ATTORNEY.

Patented Apr. 29, 1930

1,756,266

UNITED STATES PATENT OFFICE

WALTER P. VOTH, OF AKRON, OHIO, ASSIGNOR TO THE AKRON STANDARD MOLD COMPANY, OF AKRON, OHIO, A CORPORATION OF OHIO

MOLD

Application filed August 18, 1926. Serial No. 129,904.

The present invention relates to a new and improved form of curing ring for the curing of pneumatic tires, and particularly to a mechanism for dispensing with the usual "rimming up" process, as it is known in the art. The invention is shown as combined and associated with the usual form of "watchcase" vulcanizer, but the principles of the invention may be applied to other forms of molds as will be understood by those skilled in this art.

In the manufacture of pneumatic tires, it is customary to insert an air bag within the tire casing and to mount the air bag and the tire upon a curing ring, the complete assembly being placed in the mold for vulcanization. The operation of assembling these elements is known as "rimming up" and it is the purpose of the present invention to devise an improved form of mold which will dispense with the rimming up operation. It is one of the objects of the invention, further, to combine with a watchcase type of vulcanizer, the mechanism shown and described by which the tire and air bag may be quickly and accurately placed within the vulcanizer before closing.

These and other objects will be apparent to those skilled in the art to which this invention appertains, and while the description and drawing is quite detailed, as is necessary for a complete understanding of the invention, changes and modifications may be made within the scope and purview of the invention as set forth in the claims.

In copending application Serial No. 129,903 filed concurrently herewith, a somewhat similar or related arrangement of vulcanizer or mold and curing ring is shown, described and claimed in its broader aspects. The present invention is directed to the mechanism as shown, or substantially as shown in this application.

In the drawings:

Figure 1 is a front elevation of a mold unit showing the collapsible curing ring in position therein;

Figure 2 is a vertical cross-section on the line 2—2 of Figure 1, showing the ring and tire in position in the mold;

Figure 3:
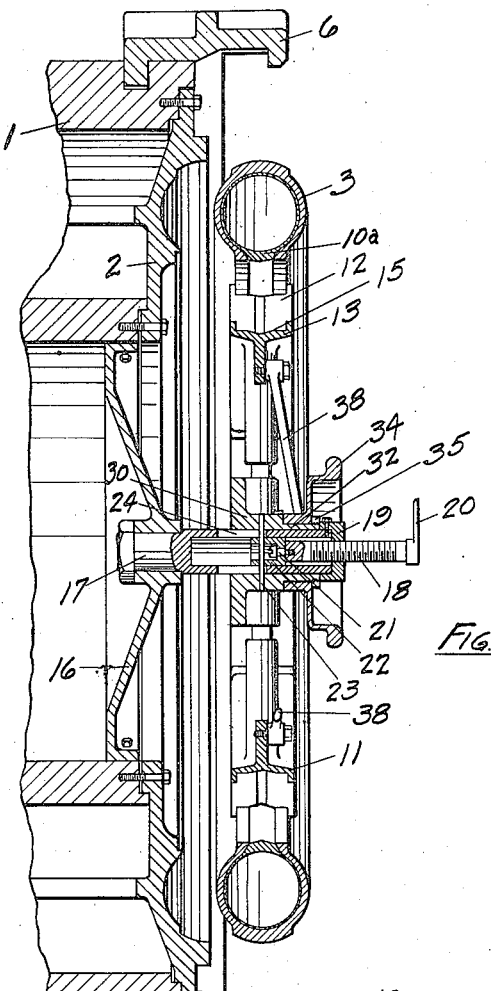
Figure 3 is a similar view showing the tire moved outwardly from the mold and the ring collapsed.
Figure 4:
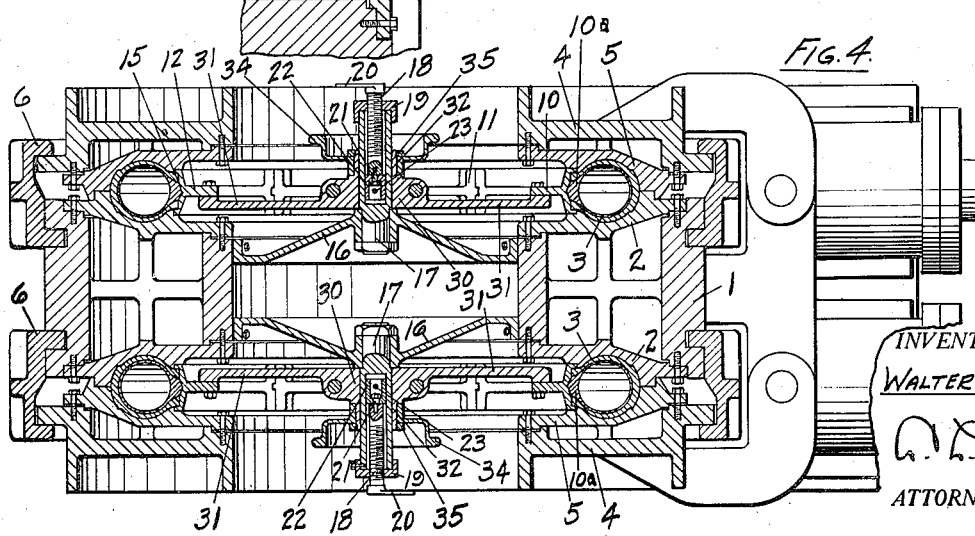
Figure 4 is a horizontal section through a complete vulcanizer of the watchcase type.

The vulcanizer comprises a central, stationary or main section 1, which is chambered for the circulation of steam or other heating medium, the sides of the section 1 being closed in by removable mold plates 2 at either side thereof, which are shaped on their outer surfaces to receive one side of a pneumatic tire casing 3, which contains the usual air bag or expansible core 10$^a$.

To the stationary mold member are hinged movable or swinging sections 4 which are hollow also and are closed in by removable plates 5 which complete the tire cavities at either side of the vulcanizer. The movable sections are clamped together during vulcanization by rotatable clamping rings 6, as is well known in this art. Further details of the apparatus need not be described as they do not have anything to do with the present invention.

The curing ring is made in four segments which are divided along tapering lines so that certain of the sections can be moved toward and from the center of the mold. Two of the segments are numbered 10 and 12, placed oppositely to one another, and intermediate segments 11 and 13, the latter being movable. The segments when placed together form a complete mold ring with a seat 15 for the reception of the tire beads and air bag.

On each side of the main section of the vulcanizer is secured a supporting disk 16, from the center of which projects a horizontal shaft 17, the outwardly extending portion of which is tubular and receives a screw-threaded shaft 18 engaging a nut 19 on the outer end of the shaft. A small lever 20 is provided for rotating the shaft, and at its inner end is loosely mounted by a bolt 21 a cap 22 through which passes a pin 23 movable in slots 24 on opposite sides of the tubular shaft 17.

The pin 23 is received in a sleeve 30 which is slidable along the shaft, the collar being provided with arms 31 extending in opposite directions and attached to the relatively immovable ring segments 10 and 12. The sleeve 30 is reduced at its outer end to form a hub 32 on which is rotatably mounted a hand wheel 34 confined by a ring nut 35. To the rear of the hand wheel are connected links 38, the opposite ends of the links being pivoted to the movable segments 11 and 13.

The operation of the apparatus will be briefly described. When the mold is open, the sleeve 30 is withdrawn to the end of the shaft, the ring 35 making a stop for the movement of the parts. The sleeve operates as a support for the curing ring, carrying with it the several segments of the curing ring, the movable segments being withdrawn by the hand wheel and links as shown in Figure 3. The tire with the air bag therein is placed over the stationary segments 10 and 12, the beads and the air bag seating at 15. The movable ring segments are then moved outwardly completing the ring and firmly and accurately seating the beads and air bag in place. A suitable aperture (not shown) is provided in one of the segments for the passage of the valve stem. The complete assembly of curing ring, tire and air bag is then moved against the mold plate and the mold is closed and locked, ready for vulcanization. The screw 18 may be used for securing the movement of the complete assembly, or other means may be employed. Also, the particular type of collapsing mechanism for the movable segments and the number and arrangement of the segments may be varied. Other changes and modifications may be made within the scope of the invention as set forth in the claims appended hereto.

What is claimed is:

1. In an apparatus for the vulcanization of pneumatic tires, the combination of a mold, a transversely divided curing ring adapted to form a seat for the beads of the tire and the air bag, a support with which the ring may be moved toward and from the mold, a rigid arm connecting the support with a ring segment, and a mechanism carried by the support and connected with a second ring segment for moving it toward and from the axis of the mold.

2. In an apparatus for the vulcanization of pneumatic tires, the combination of a mold, a transversely divided curing ring adapted to form a seat for the beads of the tire and the air bag, a shaft at the axis of the mold, a support slidable along the shaft, an arm rigid with the support and connected to one of the ring segments, and another ring segment being movable toward and from the axis of the mold.

3. In an apparatus for the vulcanization of pneumatic tires, the combination of a mold, a four-part curing ring adapted to form a seat for the beads of a tire and the air bag, a support with which the ring may be moved toward and from the mold, a rigid arm connected to two of the ring segments, and collapsing mechanism adapted to move the other ring segments toward and from the axis of the mold.

4. In an apparatus for the vulcanization of pneumatic tires, the combination of a mold, a four-part curing ring adapted to form a seat for the beads of a tire and the air bag, a support with which the ring may be moved toward and from the mold, a rigid arm connected to two of the ring segments, the other ring segments being movable toward and from the axis of the mold.

5. A mold, a shaft located at the axis of the mold, a sleeve movable along the shaft, a hand wheel upon the sleeve, arms rigid with the sleeve and links pivoted to the hand wheel, and a segmental curing ring, the several segments being connected to the arms and the links respectively.

6. A mold, a shaft located at the axis of the mold, a hand wheel rotatable upon the shaft, arms carried by the shaft and in fixed axial relation therewith and links carried by the hand wheel, and a segmental curing ring, the several segments being connected to the arms and the links respectively.

7. An apparatus for the vulcanization of tires comprising a mold, a shaft at the axis of the mold, and a curing ring carried solely by said shaft and located within the mold, the ring being divided into a plurality of segments by division lines extending transversely from side to side of the ring, a segment being supported in fixed relation to the axis of the mold to receive and support a tire thereon in alignment with the mold, and another segment being movable toward and from the axis of the mold.

8. An apparatus for the vulcanization of tires comprising a two-part mold, and a curing ring adapted to be located within the mold, the ring being provided with flanges adapted to form a seat for the tire and the air bag and being divided into a plurality of segments by division lines extending transversely from side to side of the ring, a segment being supported in fixed relation to the axis of the mold to receive and support a tire thereon in alignment with the mold, and another segment being movable toward and from the axis of the mold, and means independent of mold closing means for transilatorily moving said ring, tire and air bag into cooperation with one of the mold halves.

9. An apparatus for the vulcanization of tires comprising a mold, a curing ring located within the mold, a shaft at the axis of the mold, said shaft alone supporting said ring, the ring being divided into a plurality of segments by division lines extending transversely from side to side of the ring, a segment being supported in fixed relation to the axis of the mold to receive and support a tire thereon in alignment with the mold, and another segment being movable toward and from the axis of the mold, and means located within the ring adapted to move the latter segment.

10. An apparatus for the vulcanization of tires comprising a mold, a fixed shaft at the axis of the mold, a curing ring located within the mold, the ring being provided with flanges adapted to form a seat for the tire and the air bag and being divided into a plurality of segments by division lines extending transversely from side to side of the ring, a segment being supported in fixed relation to the axis of the mold to receive and support a tire thereon in alignment with the mold and another segment being movable toward and from the axis of the mold, and means within the ring adapted to move the latter segment, said means carried solely on said shaft.

11. An apparatus for the vulcanization of tires comprising a mold having a stationary and movable section, a curing ring supported by the stationary section, the ring being divided in a plurality of segments by transverse cuts extending across the ring, and means for moving a segment of the ring toward and from the axis of the mold, additional means for transilatorily moving said curing ring into cooperation with the stationary mold section, both of said means operating independently of the movement of the mold section.

12. An apparatus for the vulcanization of tires comprising a mold having a stationary and movable section, a curing ring supported by the stationary section, the ring having flanges forming a seat for a tire and air bag and being divided in a plurality of segments by transverse cuts extending across the ring, and means for moving a segment of the ring toward and from the axis of the mold, additional means for transilatorily moving said curing ring into cooperation with the stationary mold section, both of said means operating independently of the movement of the mold section.

WALTER P. VOTH.